(12) United States Patent
Sasaki et al.

(10) Patent No.: US 8,268,906 B2
(45) Date of Patent: Sep. 18, 2012

(54) PROCESS FOR PRODUCING FLEXIBLE POLYURETHANE FOAM, PROCESS FOR PRODUCING HOT PRESS MOLDED PRODUCT, AND HOT PRESS MOLDED PRODUCT

(75) Inventors: Takayuki Sasaki, Kamisu (JP); Daisuke Kaku, Kamisu (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/732,778

(22) Filed: Mar. 26, 2010

(65) Prior Publication Data

US 2010/0179240 A1 Jul. 15, 2010

Related U.S. Application Data

(63) Continuation of application No. PCT/JP2008/067345, filed on Sep. 25, 2008.

(30) Foreign Application Priority Data

Sep. 28, 2007 (JP) ................................. 2007-253298

(51) Int. Cl.
 *C08G 18/28* (2006.01)
(52) U.S. Cl. ........................................ 521/170; 521/174
(58) Field of Classification Search .................. 521/170, 521/174
 See application file for complete search history.

(56) References Cited

U.S. PATENT DOCUMENTS

| | | | | |
|---|---|---|---|---|
| 5,874,485 A * | 2/1999 | Milliren et al. | ............... | 521/160 |
| 6,391,935 B1 * | 5/2002 | Hager et al. | ................... | 521/170 |
| 6,491,846 B1 * | 12/2002 | Reese et al. | ............... | 252/182.27 |
| 6,653,362 B2 | 11/2003 | Toyota et al. | | |
| 6,734,219 B2 | 5/2004 | Wada et al. | | |
| 6,756,415 B2 | 6/2004 | Kimura et al. | | |
| 7,388,036 B2 | 6/2008 | Sasaki et al. | | |
| 7,388,037 B2 | 6/2008 | Sasaki et al. | | |
| 7,588,121 B2 | 9/2009 | Sasaki et al. | | |
| 7,635,724 B2 | 12/2009 | Sasaki et al. | | |
| 2004/0087675 A1 | 5/2004 | Yu | | |
| 2004/0152797 A1 | 8/2004 | Wada et al. | | |
| 2004/0229970 A1 | 11/2004 | Sasaki et al. | | |
| 2004/0266897 A1 * | 12/2004 | Apichatachutapan et al. | ............................. | 521/131 |
| 2005/0038133 A1 * | 2/2005 | Neff et al. | ...................... | 521/155 |
| 2006/0160913 A1 | 7/2006 | Sasaki et al. | | |
| 2007/0213420 A1 | 9/2007 | Kimura et al. | | |
| 2007/0219284 A1 | 9/2007 | Sasaki et al. | | |
| 2008/0081847 A1 | 4/2008 | Sasaki et al. | | |
| 2008/0085945 A1 | 4/2008 | Sasaki et al. | | |
| 2008/0114088 A1 | 5/2008 | Sasaki et al. | | |
| 2008/0176970 A1 | 7/2008 | Sasaki et al. | | |
| 2009/0062416 A1 | 3/2009 | Sasaki et al. | | |
| 2009/0215918 A1 | 8/2009 | Sasaki et al. | | |
| 2009/0239964 A1 | 9/2009 | Sasaki et al. | | |
| 2009/0270520 A1 | 10/2009 | Sasaki et al. | | |
| 2010/0096768 A1 | 4/2010 | Sasaki et al. | | |

FOREIGN PATENT DOCUMENTS

| | | |
|---|---|---|
| CN | 1132759 A | 10/1996 |
| JP | 04-246429 | 9/1992 |
| JP | 06-329753 | 11/1994 |
| JP | 07-002968 | 1/1995 |
| JP | 07-118362 | 5/1995 |
| JP | 2002-293867 | 10/2002 |
| JP | 2004-182927 | 7/2004 |
| JP | 2004-527623 | 9/2004 |
| JP | 2006-213896 | 8/2006 |
| JP | 2006-249270 | 9/2006 |
| JP | 2007-91836 | 4/2007 |
| WO | 03/059980 | 7/2003 |
| WO | 03/072626 | 9/2003 |
| WO | 2006/115169 | 2/2006 |
| WO | 2006/115169 | 11/2006 |
| WO | 2008/050841 | 5/2008 |

OTHER PUBLICATIONS

U.S. Appl. No. 12/719,930, filed Mar. 9, 2010, Sasaki, et al.
U.S. Appl. No. 13/419,556, filed Mar. 14, 2012, Sasaki, et al.
Chinese Office Action issued Dec. 12, 2011 in patent application No. 200880108314.6.

* cited by examiner

*Primary Examiner* — John Cooney
(74) *Attorney, Agent, or Firm* — Oblon, Spivak, McClelland, Maier & Neustadt, L.L.P.

(57) ABSTRACT

To provide a process for producing a flexible polyurethane foam which is excellent in low resiliency, air flow and hot moldability, and a process for producing a hot press molded product by using such a flexible polyurethane foam. Further, the present invention provides a hot press molded product which has a low resiliency and air flow.

17 Claims, No Drawings

PROCESS FOR PRODUCING FLEXIBLE POLYURETHANE FOAM, PROCESS FOR PRODUCING HOT PRESS MOLDED PRODUCT, AND HOT PRESS MOLDED PRODUCT

TECHNICAL FIELD

The present invention relates to a process for producing a flexible polyurethane foam, a process for producing a hot press molded product, and a hot press molded product.

BACKGROUND ART

A flexible polyurethane foam having a low rebound resilience i.e. low resiliency, has been widely used for a shock absorber, a sound absorbent or a vibration absorber for e.g. automobiles, electronic instruments, etc. Such a flexible polyurethane foam is required to have not only the low resiliency but also high air flow to facilitate dissipation of heat.

Further, as a flexible polyurethane foam to be used for such applications, a hot press molded product obtained by hot press molding a flexible polyurethane foam obtained by a reaction of a polyol with a polyisocyanate, has been widely used, since it can easily be molded to have an optionally set density and thickness.

As a low resilience flexible polyurethane foam, Patent Document 1 discloses a low resilience flexible polyurethane foam obtained by reacting a specific polyol with a polyisocyanate.

However, the flexible polyurethane foam as disclosed in Patent Document 1 is inadequate in hot moldability. Therefore, in order to obtain a desired density and thickness by hot press molding of the obtained flexible polyurethane foam, it is obliged to carry out hot press molding at a high temperature for a long time. Consequently, the obtainable hot press molded product is likely to have problems such as a discoloration and deterioration in the durability, air flow, etc.

Further, the following methods are disclosed as methods for improving hot moldability of flexible polyurethane foams.

A method of using a special additive such as an aliphatic monocarboxylic acid, a compound to block an isocyanate group or a cooling agent (Patent Documents 2 to 4), a method of using a trimerization catalyst (Patent Documents 5 to 7) and a method of using a modified isocyanate such as allophanate isocyanate and blocked isocyanate (Patent Documents 4 and 8).

However, by such methods, it is difficult to sufficiently impart hot moldability to a flexible polyurethane foam while maintaining excellent low resiliency and air flow. Therefore, it is desired to develop a process for producing a flexible polyurethane foam which is excellent in low resiliency, air flow and hot moldability.

Patent Document 1: WO06/115169
Patent Document 2: JP-A-7-2968
Patent Document 3: JP-A-6-329753
Patent Document 4: JP-A-2007-91836
Patent Document 5: JP-A-2004-182927
Patent Document 6: JP-A-2006-213896
Patent Document 7: JP-A-4-246429
Patent Document 8: JP-A-7-118362

DISCLOSURE OF THE INVENTION

Objects to be Accomplished by the Invention

The present invention is to provide a process for producing a flexible polyurethane foam which is excellent in low resiliency, air flow and hot moldability, and a process for producing a hot press molded product by using such a flexible polyurethane foam.

Further, the present invention is to provide a hot press molded product which is excellent in low resiliency and air flow.

Means to Accomplish the Objects

The process for producing a flexible polyurethane foam of the present invention is a process which comprises reacting a polyol composition (P) with a polyisocyanate compound (I) in the presence of an urethane-forming catalyst and a blowing agent, characterized in that the polyol composition (P) comprises the following polyol (A), the following polyol (B) and the following monool (D), and the ratio of isocyanate-reactive active hydrogen-containing compounds including the polyol composition (P) in the raw material to the polyisocyanate compound (I) is less than 90 by isocyanate index, wherein:

Polyol (A) is a polyoxypropylene polyol having an average of from 2 to 3 hydroxyl groups and a hydroxyl value of from 10 to 90 mgKOH/g, obtained by ring-opening polymerization of only propylene oxide to an initiator (a1);

Polyol (B) is a polyether polyol having an average of from 2 to 3 hydroxyl groups and a hydroxyl value of from 100 to 250 mgKOH/g, obtained by ring-opening polymerization of an alkylene oxide (b2) to an initiator (b1); and Monool (D) is a polyether monool having a hydroxyl value of from 5 to 200 mgKOH/g, obtained by ring-opening polymerization of an alkylene oxide (d2) to an initiator (d1).

In the above process for producing a flexible polyurethane foam, it is preferred that the polyol composition (P) is reacted with the polyisocyanate compound (I) in the presence of a foam stabilizer together with the urethane-foaming catalyst and the blowing agent.

It is preferred that the above polyol composition (P) further contains the following polyol (C):

Polyol (C) is a polyether polyol having an average of from 2 to 6 hydroxyl groups, a hydroxyl value of from 15 to 99 mgKOH/g and an oxyethylene group content of at least 50 mass % in the total oxyalkylene groups (100 mass %), obtained by ring-opening polymerization of an alkylene oxide (c2) to an initiator (c1).

It is preferred that the mass ratio of the polyol (A) in the polyol composition (P) is from 5 to 50 parts by mass, based on the 100 parts by mass of the total mass of the polyol (A), the polyol (B) and the polyol (C).

It is preferred that the mass ratio of the monool (D) in the polyol composition (P) is from 1 to 30 parts by mass per 100 parts by mass of the total mass of the polyol (A), the polyol (B) and the polyol (C).

The above polyol (A) is preferably a polyoxypropylene polyol obtained by ring-opening polymerization of only propylene oxide to an initiator (a1) in the presence of a double metal cyanide complex catalyst.

The above monool (D) is preferably a polyoxypropylene monool obtained by ring-opening polymerization of only propylene oxide to an initiator (d1).

Further, the process for producing a hot press molded product of the present invention is a process which comprises hot press molding a flexible polyurethane foam obtained by the process as described above.

Further, the hot press molded product of the present invention is a molded product obtained by such a process.

Effects of the Invention

According to the processes of the present invention, it is possible to produce a flexible polyurethane foam which is excellent in low resiliency, air flow and hot moldability, and a hot press molded product which is excellent in low resiliency and air flow.

Further, the hot press molded product of the present invention is excellent in low resiliency and air flow.

BEST MODE FOR CARRYING OUT THE INVENTION

The process for producing a flexible polyurethane foam (hereinafter referred to as a flexible foam) of the present invention is a process which comprises reacting a polyol composition (P) with a polyisocyanate compound (I) in the presence of an urethane-foaming catalyst and a blowing agent, and, in addition, preferably a foam stabilizer.

[Polyol Composition (P)]

The polyol composition (P) is a composition comprising the following polyol (A), polyol (B) and monool (D). Further, the polyol composition (P) preferably further contains the polyol (C).

(Polyol (A))

Polyol (A) is a polyoxypropylene polyol having an average of from 2 to 3 hydroxyl groups and a hydroxyl value of from 10 to 90 mgKOH/g, obtained by ring-opening polymerization of only propylene oxide to an initiator (a1).

As the initiator (a1), a compound having 2 or 3 active hydrogen atoms in its molecule may be used alone, or two or more such compounds may be used in combination. A compound having 2 active hydrogen atoms may, for example, be ethylene glycol, propylene glycol, 1,4-butanediol, diethylene glycol or dipropylene glycol.

A compound having 3 active hydrogen atoms may, for example, be glycerin or trimethylolpropane.

Further, the initiator (a1) is preferably a polyoxypropylene polyol having a high hydroxyl value obtained by ring-opening polymerization of only propylene oxide to the above compound. Specifically, it is preferred to employ a high hydroxyl value polyoxypropylene polyol having a molecular weight of from about 200 to 500 per hydroxyl group, i.e. a hydroxyl value of from 110 to 280 mgKOH/g.

The polyol (A) can be obtained by ring-opening polymerization of only propylene oxide to the initiator (a1). By the ring-opening polymerization of only propylene oxide, it becomes easy to control the reactivity during the production of the flexible foam.

The polymerization catalyst for the ring-opening polymerization of propylene oxide to the initiator (a1) may, for example, be a double metal cyanide complex catalyst (hereinafter referred to as a DMC catalyst), a phosphazenium complex compound, a Lewis acid compound or an alkali metal compound catalyst. Among them, an alkali metal compound catalyst or a DMC catalyst is preferred, and a DMC catalyst is more preferred.

That is, a particularly preferred polyol (A) is a polyoxypropylene polyol obtained by ring-opening polymerization of only propylene oxide by using a DMC catalyst. By the use of a DMC catalyst, it is possible to reduce a by-product monool and to obtain a polyol having a narrow molecular weight distribution. A polyol having a narrow molecular weight distribution has a low viscosity as compared with a polyol having a wide molecular weight distribution in a same level of the molecular weight region (a polyol having the same hydroxyl value), and thus is excellent in blendability with other reactive raw materials, whereby at the time of producing a flexible foam, the stability of the foam will be improved.

As the alkali metal compound catalyst, potassium hydroxide (KOH) or cesium hydroxide (CsOH) may, for example, be mentioned.

As the DMC catalyst, one disclosed in JP-B-46-27250 may, for example, be used. As a specific example, a complex composed mainly of zinc hexacyanocobaltate may be mentioned, and its ether and/or alcohol complex is preferred. As the ether, ethylene glycol dimethyl ether (glyme), diethylene glycol dimethyl ether (diglyme), ethylene glycol mono-tert-butyl ether (METB), ethylene glycol mono-tert-pentyl ether (METP), diethylene glycol mono-tert-butyl ether (DETB) or tripropylene glycol monomethyl ether (TPME) may, for example, be preferred. As the alcohol, the tert-butyl alcohol may, for example, be preferred.

The average number of hydroxyl groups in the polyol (A) is from 2 to 3. In the present invention, the average number of hydroxyl groups means an average value of number of active hydrogen atoms in the initiator. By adjusting the average number of hydroxyl groups to be from 2 to 3, it is possible to prevent deterioration of the elongation of the obtainable flexible foam or to increase the hardness thereby to prevent deterioration of the physical properties such as the tensile strength.

The polyol (A) preferably contains a polyether diol having two hydroxyl groups in an amount of from 50 to 100 mass % in the total polyol (A) (100 mass %). Because it is easy to suppress the temperature sensitivity.

The hydroxyl value of the polyol (A) is from 10 to 90 mgKOH/g, preferably from 10 to 60 mgKOH/g, more preferably from 15 to 60 mgKOH/g. By adjusting the hydroxyl value to be at least 10 mgKOH/g, it is possible to suppress collapse, etc. and to produce a flexible foam constantly. Further, by adjusting the hydroxyl value to be at most 90 mgKOH/g, it is possible to suppress the rebound resilience to be low without impairing the flexibility of the obtainable flexible foam.

The total unsaturation value of the polyol (A) is preferably at most 0.05 meq/g, more preferably at most 0.01 meq/g, further preferably at most 0.006 meq/g. By adjusting the total unsaturation value to be at most 0.05 meq/g, the durability of the obtainable flexible foam will be improved. The lower limit of the total unsaturation value is ideally 0 meq/g.

The polyol (A) may be a polymer-dispersed polyol. The polymer-dispersed polyol is a polyol having fine polymer particles (dispersoid) dispersed in a base polyol (dispersing medium).

The presence of such fine polymer particles in the polyol is effective to improve the mechanical properties such that it is thereby possible to increase the hardness of the flexible foam. Various physical properties (such as total unsaturation value, hydroxyl value, etc.) of the polymer-dispersed polyol as a polyol, are considered with respect to the base polyol excluding such fine polymer particles. That is, in a case where the polyol (A) is a polymer-dispersed polyol, the average number of hydroxyl groups of the base polyol is from 2 to 3, and the hydroxyl value of the base polyol is from 10 to 90 mgKOH/g.

The polymer for the fine polymer particles may be an addition polymerization type polymer or a condensation polymerization type polymer.

The addition polymerization type polymer may, for example, be obtained by homopolymerizing or copolymerizing a monomer such as acrylonitrile, styrene, a methacrylate or an acrylate. Further, the condensation polymerization type polymer may, for example, be a polyester, a polyurea, a polyurethane or a polymethylolmelamine.

The content of the fine polymer particles in the polymer-dispersed polyol is not particularly limited, but it is preferably from 0 to 5 mass %, based on the entire polyol (A) (100 mass %).

(Polyol (B))

The polyol (B) is a polyether polyol having an average of from 2 to 3 hydroxyl groups and a hydroxyl value of from 100 to 250 mgKOH/g, obtained by ring-opening polymerization of an alkylene oxide (b2) to an initiator (b1).

As the initiator (b1), a compound having 2 or 3 active hydrogen atoms in its molecule may be used alone, or two or more such compounds may be used in combination.

The compound having 2 or 3 active hydrogen atoms may, for example, be a polyhydric alcohol such as ethylene glycol, propylene glycol, 1,4-butanediol, diethylene glycol, dipropylene glycol, glycerin or trimethylolpropane; a polyhydric phenol such as bisphenol A; or an amine such as monoethanolamine, diethanolamine, triethanolamine or piperazine. Among them, a polyhydric alcohol is particularly preferred.

Further, as the initiator (b1), it is preferred to use a polyether polyol having a high hydroxyl value obtained by ring-opening polymerization of an alkylene oxide, preferably propylene oxide, to the above compound.

The alkylene oxide (b2) may, for example, be ethylene oxide, propylene oxide, 1,2-epoxybutane or 2,3-epoxybutane. Among them, it is preferred to use propylene oxide alone, or propylene oxide and ethylene oxide in combination.

The polyol (B) is preferably a polyoxypropylene polyol obtained by ring-opening polymerization of only propylene oxide to the initiator (b1), whereby the reactivity during the production of the flexible foam will be easily controllable.

The polymerization catalyst for the ring-opening polymerization of the alkylene oxide (b2) to the initiator (b1) may, for example, be a phosphazenium complex compound, a Lewis acid compound or an alkali metal compound catalyst. Among them, an alkali metal compound catalyst is preferred.

The alkali metal compound catalyst may, for example, be potassium hydroxide (KOH) or cesium hydroxide (CsOH).

The average number of hydroxyl groups in the polyol (B) is from 2 to 3. By adjusting the average number of hydroxyl groups to be from 2 to 3, it is possible to prevent deterioration of the elongation of the obtainable flexible foam or to prevent deterioration of the physical property such as the tensile strength by an increase of the hardness.

The average number of hydroxyl groups in the polyol (B) is preferably from 2.0 to 2.7, more preferably from 2.0 to 2.6. By adjusting the average number of hydroxyl groups in the polyol (B) to be within such a range, it is possible to suppress the rebound resilience to be low and to readily obtain a flexible foam with little change in hardness (with low temperature sensitivity).

Further, for the polyol (B), it is preferred to use a polyether diol having an average of 2 hydroxyl groups and a polyether triol having an average of 3 hydroxyl groups in combination, and the mass ratio of the polyether diol having an average of 2 hydroxyl groups in the polyol (B) is preferably at least 40 mass %, more preferably at least 45 mass %, based on the total mass (100 mass %) of the polyol (B) and the following polyol (C). By adjusting the mass ratio of the polyether diol having an average of 2 hydroxyl groups to be at least 40 mass %, it is possible to readily obtain a flexible foam having a low rebound resilience and a small change in hardness (a low temperature sensitivity).

The hydroxyl value of the polyol (B) is from 100 to 250 mgKOH/g, preferably from 100 to 200 mgKOH/g. By adjusting the hydroxyl value to be at least 100 mgKOH/g, it is possible to suppress collapse, etc. and to produce a flexible foam constantly. Further, by adjusting the hydroxyl value to be at most 250 mgKOH/g, it is possible to suppress the rebound resilience to be low while not impairing the flexibility of the obtainable flexible foam.

The polyol (B) may be a polymer-dispersed polyol. In a case where the polyol (B) is a polymer-dispersed polyol, the average number of hydroxyl groups in the base polyol is from 2 to 3, and the hydroxyl value of the base polyol is from 100 to 250 mgKOH/g. As the polymer for such fine polymer particles, it is possible to use the same one as mentioned in the case of the polyol (A). Further, the content of the fine polymer particles in the polymer-dispersed polyol is not particularly limited, but is preferably from 0 to 10 mass %, based on the entire polyol (B) (100 mass %).

The polyol (B) is preferably a polyoxypropylene polyol having a hydroxyl value of from 100 to 250 mgKOH/g (more preferably from 100 to 200 mgKOH/g) obtained by ring-opening polymerization of only propylene oxide to the initiator (b1). By using such a polyoxypropylene polyol as the polyol (B), the reactivity during the production of the flexible foam will be easily controllable.

(Monool (D))

The monool (D) is a polyether monool having a hydroxyl value of from 5 to 200 mgKOH/g, obtained by ring-opening polymerization of an alkylene oxide (d2) to an initiator (d1). That is, it is a polyether monool obtained by ring-opening polymerization of an alkylene oxide (d2) to the initiator (d1) in the presence of a polymerization catalyst.

As the initiator (d1), a compound having one active hydrogen atom in its molecule may be used alone, or two or more such compounds may be used in combination.

The compound having one active hydrogen atom may, for example, be a monool such as methanol, ethanol, n-propyl alcohol, isopropyl alcohol, n-butyl alcohol or tert-butyl alcohol; a monohydric phenol such as phenol or nonyl phenol; or a secondary amine such as dimethylamine or diethylamine.

Further, a polyether monool obtained by ring-opening polymerization of an alkylene oxide, preferably propylene oxide, to the above compound, may also be used.

The alkylene oxide (d2) may, for example, be ethylene oxide, propylene oxide, 1,2-epoxybutane or 2,3-epoxybutane. Among them, it is preferred to use propylene oxide alone or propylene oxide and ethylene oxide in combination, and use of only propylene oxide is particularly preferred. By using only propylene oxide, the reactivity during the production of the flexible foam will be easily controllable.

As the polymerization catalyst for the ring-opening polymerization of the alkylene oxide (d2) to the initiator (d1), a DMC catalyst, a phosphazenium complex compound, a Lewis acid compound or an alkali metal compound catalyst is preferred. Among them, a DMC catalyst is particularly preferred. That is, the particularly preferred monool (D) is a polyether monool having a polyoxyalkylene chain obtained by ring-opening polymerization of propylene oxide by using a DMC catalyst.

The average number of hydroxyl groups in the monool (D) is 1. Further, the hydroxyl value of the monool (D) is from 5 to 200 mgKOH/g, preferably from 10 to 120 mgKOH/g.

(Polyol (C))

The polyol composition (P) of the present invention preferably contains the polyol (C) together with the polyol (A), the polyol (B) and the monool (D). When the polyol composition (P) contains the polyol (C), the air flow, etc. of the obtainable flexible foam will be improved.

The polyol (C) is a polyether polyol having an average of from 2 to 6 hydroxyl groups, a hydroxyl value of from 15 to 99 mgKOH/g and an oxyethylene group content of at least 50 mass % in the total oxyalkylene groups (100 mass %), obtained by ring-opening polymerization of an alkylene oxide (c2) to an initiator (c1).

As the initiator (c1), a compound having from 2 to 6 active hydrogen atoms in its molecule may be used alone, or two or more such compounds may be used in combination. As specific examples of the compound having from 2 to 6 active hydrogen atoms, in addition to those mentioned with respect to the initiator (b1), diglycerin, pentaerythritol and sorbitol may, for example, be mentioned. Among them, a polyhydric alcohol is particularly preferred. Further, as the initiator (c1), it is preferred to use a polyether polyol having a high hydroxyl value obtained by ring-opening polymerization of an alkylene oxide, preferably propylene oxide, to the above compound.

The alkylene oxide (c2) may, for example, be ethylene oxide, propylene oxide, 1,2-epoxybutane or 2,3-epoxybutane. Among them, combined use of propylene oxide and ethylene oxide is particularly preferred.

The polyol (C) is preferably a polyoxypropyleneoxyethylene polyol having an oxyethylene group content of from 50 to 100 mass %, in the total oxyalkylene groups (100 mass %), obtained by ring-opening polymerization of a mixture of propylene oxide and ethylene oxide, from such a viewpoint that the air flow of the obtainable flexible foam will be improved. In a case where such a polyoxypropyleneoxyethylene polyol is used as the polyol (C), the mass ratio of the polyoxypropyleneoxyethylene polyol to the total mass (100 mass %) of the polyol (B) and the polyol (C) is preferably from 1 to 20 mass %, more preferably from 2 to 10 mass %.

As the polymerization catalyst for the ring-opening polymerization of the alkylene oxide (c2) to the initiator (c1), a phosphazenium complex compound, a Lewis acid compound or an alkali metal compound catalyst may be mentioned.

The alkali metal compound catalyst may, for example, be potassium hydroxide (KOH) or cesium hydroxide (CsOH).

The average number of hydroxyl groups in the polyol (C) is from 2 to 6. By adjusting the average number of hydroxyl groups to be from 2 to 6, it is possible to prevent deterioration of the elongation of the obtainable flexible foam or to prevent deterioration of the physical property such as the tensile strength by an increase of the hardness.

The average number of hydroxyl groups in the polyol (C) is preferably from 2.0 to 6.0, more preferably from 3.0 to 4.0. By adjusting the average number of hydroxyl groups in the polyol (C) to be within such a range, it is possible to readily obtain a flexible foam having the air flow improved.

The hydroxyl value of the polyol (C) is from 15 to 99 mgKOH/g, preferably from 15 to 60 mgKOH/g. By adjusting the hydroxyl value to be at least 15 mgKOH/g, it is possible to suppress collapse, etc. and to produce the flexible foam constantly. Further, by adjusting the hydroxyl value to be at most 99 mgKOH/g, it is possible to suppress the rebound resilience to be low without impairing the flexibility of the obtainable flexible foam.

The polyol (C) may be a polymer-dispersed polyol. In a case where the polyol (C) is a polymer-dispersed polyol, the average number of hydroxyl groups in the base polyol is from 2 to 3, and the hydroxyl value of the base polyol is from 15 to 99 mgKOH/g.

As the polymer for the fine polymer particles, the same one as mentioned in the case of the polyol (A) may be used. Further, the content of the fine polymer particles in the polymer-dispersed polyol is not particularly limited, but is preferably from 0 to 10 mass %, based on the entire polyol (C) (100 mass %).

For the polyol composition (P) of the present invention, it is particularly preferred to use the polyol (B) having a hydroxyl value of from 100 to 250 mgKOH/g (more preferably from 100 to 200 mgKOH/g) obtained by ring-opening polymerization of only propylene oxide to the initiator (b1) and the polyol (C) having an oxyethylene group content of from 50 to 100 mass % in the total oxyalkylene groups and a hydroxyl value of from 15 to 99 mgKOH/g (more preferably from 15 to 60 mgKOH/g) obtained by ring-opening polymerization of a mixture of propylene oxide and ethylene oxide to the initiator (c1), in combination. By such combined use of the polyol (B) and the polyol (C), the air flow of the obtainable flexible foam will be more improved.

The mass ratio of the polyol (A) in the polyol composition (P) is preferably from 5 to 50 parts by mass, more preferably from 10 to 30 parts by mass, based on 100 parts by mass of the total mass of the polyol (A), the polyol (B) and the polyol (C). When the mass ratio of the polyol (A) is at least 5 parts by mass, it is possible to obtain a flexible foam having a low resiliency and a small change in hardness and rebound resilience to a temperature change (a low temperature sensitivity). Further, when the mass ratio of the polyol (A) is at most 50 parts by mass, the foaming stability during the production of the flexible foam will be good.

The mass ratio of the polyol (B) in the polyol composition (P) is preferably from 50 to 90 parts by mass, more preferably from 60 to 80 parts by mass, based on 100 parts by mass of the total mass of the polyol (A), the polyol (B) and the polyol (C).

The mass ratio of the polyol (C) in the polyol composition (P) is preferably from 3 to 15 parts by mass, more preferably from 5 to 10 parts by mass, based on 100 parts by mass of the total mass of the polyol (A), the polyol (B) and the polyol (C).

The mass ratio of the total mass of the polyol (A), the polyol (B) and the polyol (C) in the polyol composition (P) (100 mass %) is preferably at least 75 mass %, more preferably at least 80 mass %, further preferably at least 85 mass %, particularly preferably at least 90 mass %. By adjusting such a mass ratio to be at least 75 mass %, it is possible to obtain a flexible foam having a low resiliency and good air flow.

The mass ratio of the monool (D) in the polyol composition (P) is preferably from 1 to 30 parts by mass, per 100 parts by mass of the total mass of the polyol (A), the polyol (B) and the polyol (C). Further, when tin 2-ethylhexanoate is used as the urethane-forming catalyst, the said mass ratio is more preferably from 1 to 10 parts by mass, further preferably from 2 to 8 parts by mass. Further, in a case where dibutyltin dilaurate is used as the urethane-forming catalyst, such a mass ratio is more preferably from 5 to 30 parts by mass.

By adjusting the mass ratio of the monool (D) to be within the above range, it is possible to obtain a flexible foam having a low resiliency and good air flow.

A preferred composition for the polyol composition (P) (100 mass %) of the present invention may, for example, be from 10 to 30 mass % of the polyol (A), from 60 to 80 mass % of the polyol (B), from 5 to 10 mass % of the polyol (C) and from 2 to 24 mass % of the monool (D).

The polyol composition (P) of the present invention may contain the polyol (E) other than the polyols (A) to (C) and the monool (D). The polyol (E) is a polyol other than any one of the polyols (A), (B) and (C).

The mass ratio of the polyol (E) in the polyol composition (P) (100 mass %), is preferably at most 10 mass %, more preferably at most 5 mass %, particularly preferably 0 mass %.

[Polyisocyanate Compound (I)]

The polyisocyanate compound (I) may, for example, be a polyisocyanate of an aromatic, alicyclic or aliphatic type having at least 2 isocyanate groups; a mixture of two or more such polyisocyanates; or a modified polyisocyanate obtained by modifying such a polyisocyanate or a mixture.

Specific examples of the polyisocyanate include, for example, tolylene diisocyanate (TDI), diphenylmethane diisocyanate (MDI), polymethylenepolyphenyl polyisocyanate (so-called crude MDI), xylylene diisocyanate (XDI), isophorone diisocyanate (IPDI) and hexamethylene diisocyanate (HMDI).

Further, the modified polyisocyanate may, for example, be a prepolymer type modified product, an isocyanurate modified product, a urea modified product or a carbodiimide modified product of each of the above polyisocyanates. Among them, TDI, MDI, crude MDI or the modified product is preferred. It is particularly preferred to use TDI, crude MDI or the modified product (particularly a prepolymer type modified product) from such a viewpoint that the foaming stability will be improved. Particularly, from such a viewpoint that the air flow of the obtainable flexible foam will be improved, it is preferred to use a polyisocyanate compound having a relatively low reactivity among TDI, crude MDI or the modified product. Specifically, a TDI mixture having a high proportion (particularly at least 30 mass %) of 2,6-TDI, is preferred.

The present invention is characterized in that isocyanate-reactive active hydrogen-containing compounds including the polyol composition (P) are reacted with the polyisocyanate compound (I) at an isocyanate index of less than 90. Here, the isocyanate index is represented by 100 times a numerical value obtained by dividing the equivalent amount of isocyanate groups in the polyisocyanate compound (I) by the equivalent amount of the total of active hydrogen atoms in other active hydrogen compounds.

By adjusting the isocyanate index to be less than 90, it is possible to obtain a flexible foam excellent in hot moldability such as a thermal compression property or a hot press property.

In the present invention, the reaction of the polyol composition (P) with the polyisocyanate compound (I) is carried out at an isocyanate index of preferably at most 85, more preferably from 65 to 85, further preferably from 70 to 85, particularly preferably from 75 to 85.

By adjusting the isocyanate index to be at least 65, a flexible foam excellent in hot moldability will readily be obtainable.

[Urethane-forming Catalyst]

As the urethane-forming Catalyst, it is possible to use any catalyst which promotes the urethane-forming reaction, and it may, for example, be a tertiary amine such as triethylene diamine, bis(2-dimethylaminoethyl)ether or N,N,N',N'-tetramethylhexamethylene diamine; a metal salt of a carboxylic acid such as potassium acetate or potassium 2-ethylhexanoate; or an organic metal compound such as stannous octoate or dibutyltin dilaurate.

[Blowing Agent]

As the blowing agent, it is possible to use a known blowing agent such as a fluorinated hydrocarbon without any particular restriction. However, in the present invention, it is preferred to use at least one member selected from water and an inert gas. The inert gas may, for example, be air, nitrogen or carbon dioxide gas.

Among them, it is particularly preferred to use only water as the blowing agent.

The amount of the blowing agent to be used, when water is used, is preferably at most 10 parts by mass, more preferably from 0.1 to 4 parts by mass, per 100 parts by mass of the polyol composition (P).

In the process for producing a flexible polyurethane foam of the present invention, a foam stabilizer may be used. By the use of a foam stabilizer, the foaming stability during the production of the flexible foam will be excellent, and good foams can be formed.

[Foam Stabilizer]

As the foam stabilizer, a silicone foam stabilizer or a fluorinated foam stabilizer may, for example, be mentioned. Among them, the silicone foam stabilizer is preferred. Among silicone foam stabilizers, a silicone foam stabilizer containing a polyoxyalkylene/dimethylpolysiloxane copolymer as the main component, is preferred. The amount of the foam stabilizer to be used is preferably from 0.01 to 2 parts by mass, more preferably from 0.1 to 1.0 part by mass, per 100 parts by mass of the polyol composition (P).

[Flame Retardant]

In the present invention, a flame retardant may be used in addition to the above mentioned urethane-forming catalyst, blowing agent and foam stabilizer. As such a flame retardant, an organic compound such as a halogenated compound, a phosphoric acid ester compound, a halogenated phosphoric acid ester compound or melamine, or an inorganic compound such as aluminum hydroxide, zinc oxide or expandable graphite may, for example, preferably be mentioned. Such flame retardants may be used alone or in combination as a mixture of two or more of them.

For example, a hot press molded product to be used as a component of an office automation equipment or as a component of an electrical equipment, is required to have a flame retardancy depending upon its particular use, and the above flame retardant is used for such a product.

The amount of the flame retardant to be used is preferably from 3 to 60 parts by mass, more preferably from 5 to 50 parts by mass, per 100 parts by mass of the polyol composition (P).

[Other Additives]

In the present invention, desired additives may be used in addition to the above-mentioned urethane-forming catalyst, blowing agent, foam stabilizer and flame retardant. Such additives may, for example, be a filler such as potassium carbonate or barium sulfate; a surfactant such as an emulsifier; an aging-preventive agent such as an antioxidant or an ultraviolet absorber; a plasticizer, a coloring agent, an antifungal agent, a cell opener, a dispersant and a discoloration-preventive agent.

[Production Process]

The process for producing a flexible foam of the present invention may be a method (mold method) wherein a reactive mixture is injected into an opened mold, then the mold is closed, following by foaming and molding, or a method (slab method) wherein a reactive mixture is foamed in an open system. A slab method is preferred. Specifically, foaming can be carried out by a known method such as a one shot method, a semi prepolymer method or a prepolymer method. For the production of a flexible polyurethane foam, a production apparatus commonly employed, may be used.

The process for producing a hot press molded product of the present invention is a process which comprises hot press molding a flexible polyurethane foam obtained by the above described process. A hot press molding machine which may be used for the hot press molding is not particularly limited, and a conventional one may be used. The hot press temperature varies depending upon the obtainable flexible foam, but it is preferably a temperature lower by from 10 to 50° C. than the temperature at which the flexible foam is hot-meltable. Specifically, the hot press temperature is preferably from 120 to 200° C., more preferably from 120 to 180° C.

By adjusting the hot press temperature to be at least 120° C., it is possible to hot press mold the flexible foam easily in a short time. Further, by adjusting the hot press temperature to be at most 180° C., it is possible to readily obtain a hot press molded product having suppressed a color change of the foam and deterioration of the mechanical strength by thermal fusion of the flexible foam.

[Hot Press Molded Product]

The hot press molded product of the present invention has a low resiliency.

The rebound resilience of the flexible foam to be used for the production of the hot press molded product is preferably at most 20%, more preferably at most 15%, further preferably at most 10%, particularly preferably at most 8%. When the rebound resilience is at most 10%, it is possible to readily obtain a hot press molded product having an excellent low resiliency. The ideal rebound resilience is 0%.

The rebound resilience can be measured by a method in accordance with JIS K6400 (1997 edition).

Further, the hot press molded product of the present invention has good air flow.

The air flow of the flexible foam to be used for the production of the hot press molded product is preferably from 30 to 100 L/min, more preferably from 40 to 100 L/min, particularly preferably from 70 to 100 L/min. When the air flow is within such a range, it is possible to readily obtain a hot press molded product having excellent air flow.

The air flow can be measured by a method in accordance with JIS K6400 (1997 edition).

As described above, according to the process of the present invention, it is possible to obtain a flexible foam having excellent low resiliency, air flow and hot moldability. Further, by hot press molding such a flexible foam, it is possible to obtain a hot press molded product having excellent low resiliency and air flow.

Such excellent performance is considered to be attributable to a synergistic effect of the following two points. (1) Since a diol having a low hydroxyl value (i.e. a high molecular weight) is contained as a component, the urethane resin essentially forming the flexible foam has thermoplasticity. (2) By adjusting the isocyanate index to be less than 90, unreacted hydroxyl groups derived from the polyol component are present, whereby the crosslinking density of the urethane resin is low, and a strain against a load tends to be large. Especially, this effect is assumed to be more distinct when the isocyanate index becomes lower than 90.

The hot press molded product obtained by the process of the present invention has excellent low resiliency and air flow, and it is useful, for example, as a packing for a hard disk which has high vibration absorption and excellent heat dissipation properties.

EXAMPLES

Now, the present invention will be described in detail with reference to Examples and Comparative Examples, but the present invention is by no means thereby restricted. In the following Examples and Comparative Examples, "parts" means "parts by mass".

Raw materials used in Examples and Comparative Examples are as follows.

[Polyol Composition (P)]

(Polyol (A))

Polyol A1: A polyoxypropylene polyol having an average of 2 hydroxyl groups and a hydroxyl value of 14 mgKOH/g, obtained by ring-opening polymerizing propylene oxide to a molecular weight of 1,000 by using dipropylene glycol as an initiator in the presence of a potassium hydroxide catalysts, followed by purification with magnesium silicate, and then, ring-opening polymerizing propylene oxide using the above compound as an initiator (a1) in the presence of a zinc hexacyanocobaltate/tert-butyl alcohol complex catalyst as a DMC catalyst.

Polyol A2: A polyoxypropylene polyol having an average of 2 hydroxyl groups and a hydroxyl value of 18 mgKOH/g, obtained by ring-opening polymerizing propylene oxide by using dipropylene glycol as an initiator (a1) in the presence of a potassium hydroxide catalyst.

(Polyol (B))

Polyol B1: A polyoxypropylene polyol having an average of 2 hydroxyl groups and a hydroxyl value of 160 mgKOH/g, obtained by ring-opening polymerizing propylene oxide by using dipropylene glycol as an initiator (b1) in the presence of a potassium hydroxide catalyst.

Polyol B2: A polyoxypropylene polyol having an average of 3 hydroxyl groups and a hydroxyl value of 168 mgKOH/g, obtained by ring-opening polymerizing propylene oxide by using glycerol as an initiator (b1) in the presence of a potassium hydroxide catalyst.

(Polyol (C))

Polyol C1: A polyoxypropyleneoxyethylene polyol having an average of 3 hydroxyl groups, a hydroxyl value of 48 mgKOH/g and an oxyethylene group-content of 80 mass % in the total oxyalkylene groups (100 mass %), obtained by ring-opening polymerizing a mixture of propylene oxide and ethylene oxide by using glycerol as an initiator (c1) in the presence of a potassium hydroxide catalyst.

(Monool (D))

Monool D1: A polyoxypropylene monool having an average of 1 hydroxyl group and a hydroxyl value of 17 mgKOH/g, obtained by ring-opening polymerizing propylene oxide by using n-butyl alcohol as an initiator (d1) in the presence of a zinc hexacyanocobaltate/tert-butyl alcohol complex catalyst as a DMC catalyst.

[Urethane-Foaming Catalyst]

Amine catalyst N1: A dipropylene glycol solution of triethylene diamine (tradename: TEDA-L33, manufactured by TOSOH CORPORATION).

Metal catalyst M1: Dibutyltin dilaurate (tradename: NEOSTANN U-100, manufactured by NITTO KASEI CO., LTD.).

Metal catalyst M2: Tin 2-ethylhexanoate (tradename: DABCO T-9, manufactured by Air Products and Chemicals, Inc.).

[Blowing Agent]

Blowing agent H1: Water

[Foam Stabilizer]

Foam stabilizer S1: A silicone foam stabilizer (tradename: Tegostab B-8716LF, manufactured by Goldschmidt).

Foam stabilizer S2: A silicone foam stabilizer (tradename: Tegostab B-8229, manufactured by Goldschmidt).

[Flame Retardant]

Flame retardant F1: Melamine powder (manufactured by Nissan Chemical Industries, Ltd.)

Flame retardant F2: Halogen-containing condensed phosphoric acid ester (tradename: CR-504L, manufactured by DAIHACHI CHEMICAL INDUSTRY CO., LTD.)

[Polyisocyanate Compound (I)]

Polyisocyanate I1: TDI-80 (mixtured of 2,4-TDI/2,6-TDI=80/20 mass %), isocyanate group-content: 48.3 mass % (tradename: CORONATE T-80, NIPPON POLYURETHANE INDUSTRY CO., LTD.)

Now, Examples and Comparative Examples will be described.

Example 1

Polyol A1 (27.7 parts), polyol B1 (38.8 parts), polyol B2 (31 parts), polyol C1 (6 parts), monool D1 (7.5 parts), amine catalyst N1 (0.25 part), metal catalyst M1 (0.04 part), water (1.44 parts), foam stabilizer S1 (0.35 part) and foam stabilizer S2 (0.35 part) were mixed to obtain a polyol system liquid, which was adjusted to a liquid temperature of 21±1° C. Further, polyisocyanate I1 (isocyanate index 80) was adjusted to a liquid temperature of 21±1° C.

To the polyol system liquid, a predetermined amount of the polyisocyanate I1 was added (isocyanate index 80) followed by stirring for 5 seconds by a mixer (rotational speed: 1,425 rpm), and the mixture was injected at room temperature into a wooden box of 300 mm×300 mm×300 mm with an open top and lined with a plastic sheet, to obtain a flexible foam (slab foam). The obtained flexible polyurethane foam was taken out and left to stand for 24 hours in a room adjusted to have room temperature (23° C.) and a humidity of 50%, whereupon various physical properties were measured.

Examples 2 to 8

Flexible foams were obtained in the same manner as in Example 1 except that the composition of the polyol system liquid and the isocyanate index were changed as shown in Tables 1 and 2, and various physical properties were measured.

Comparative Examples 1 to 5

Flexible foams were obtained in the same manner as in Example 1 except that the composition of the polyol system liquid and the isocyanate index were changed as shown in Tables 1 and 2, and various physical properties were measured.

[Evaluation of Physical Properties]
(Density, Air Flow, 25% Hardness, Rebound Resilience, Dry Set, Wet Set)

With respect to the flexible foams in Examples 1 to 8 and Comparative Examples 1 to 5, the density, air flow, 25% hardness (25% ILD), rebound resilience, dry set and wet set were measured in accordance with JIS K6400 (1997 edition). Here, the air flow was measured in accordance with method B of JIS K6400 (1997 edition).

The results of measurements of the respective physical properties are shown in Tables 1 and 2.

(Thermal Compression Test)

With respect to the flexible foams in Examples 1 to 5 and Comparative Examples 1 to 3, a thermal compression test was carried out by the following method. The results are shown in Table 1.

From an obtained flexible foam, a sample of 50 mm×50 mm×40 mm in thickness was cut out, and such a sample was sandwiched between two metal plates from above and below, and a weight of 20 kg was placed on the metal plate to thermally compress the sample at 70° C. or 100° C. The thermal compression time was 0.5, 1.0, 2.0, 4.0, 6.0 or 8.0 hours. After the thermal compression, the sample was taken out from between the metal plates, and its thickness was immediately measured, whereupon the compressibility was calculated by the following formula.

$$\text{Compressibility}(\%) = [(40-X)/40] \times 100$$

wherein X is the thickness (mm) of the sample after the compression.

(Flame Retardancy)

With respect to the flexible foams in Examples 4 and 5, a flame retardancy test was carried out by the following method. The results are shown in Table 1.

The evaluation of flame retardancy was carried out in accordance with the Horizontal Flammability Test of UL94. At 25 mm, 60 mm and 125 mm from one end of a foam test specimen, reference lines were drawn, and the end of the specimen which was closer to the 60 mm reference line, was placed to be in contact with a bended portion of a metal mesh, and a blue flame of 38±2 mm of a gas burner was immediately located at the end of the bended portion of the metal mesh, followed by combustion. After a test flame was applied for 60±1 seconds, the gas burner was removed, and the measurement of time was started. When the flame reached the 25 mm reference line, another timer was started.

Judgment was made on such a basis that between the 25 mm reference line and the 125 mm reference line, if the combustion rate was at most 40 mm/min, or if the combustion stopped before the 125 mm reference line (shown as HBF), such was designated to be as "passed", and other than that was designated as "failed".

(Hot Press Test)

With respect to the flexible foams in Examples 6 to 8 and Comparative Examples 1, 4 and 5, a hot press test was carried out by the following method. The results are shown in Table 2.

From an obtained flexible foam, a sample of 50 mm×150 mm×20 mm in thickness was cut out, and by using a hot press molding machine (tradename: hydraulic molding machine, manufactured by IWAKI CO.,LTD.), the sample was hot press molded to a thickness of 4 mm for 90 seconds under conditions of 150° C. and a pressure of 20 MPa. The molded state of the foam after expiration of one hour after the hot press molding was evaluated based on the following standards.

○: No change was observed in the thickness of the foam between immediately after the hot press (4 mm) and upon expiration of one hour.

Δ: A change of at most 10% was observed in the thickness of the foam between immediately after the hot press (4 mm) and upon expiration of one hour.

x: The thickness of the foam did not change from before the hot press molding.

TABLE 1

|  |  |  | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|---|---|
| Polyol composition (P) | Polyol (A) | A1 | 27.7 | — | 27.7 | 27.7 | 27.7 | 27.7 | — | 27.7 |
|  |  | A2 | — | 27.7 | — | — | — | — | 27.7 | — |
|  | Polyol (B) | B1 | 38.8 | 38.8 | 38.8 | 38.8 | 38.8 | 38.8 | 38.8 | 38.8 |
|  |  | B2 | 31 | 31 | 31 | 31 | 31 | 31 | 31 | 31 |
|  | Polyol (C) | C1 | 6 | 6 | — | 6 | 6 | 6 | 6 | — |
|  | Monool (D) | D1 | 7.5 | 7.5 | 7.5 | 7.5 | 7.5 | 7.5 | 7.5 | 7.5 |
|  | Urethane-forming catalyst | N1 | 0.25 | 0.25 | 0.25 | 0.25 | 0.25 | 0.25 | 0.25 | 0.25 |
|  |  | M1 | 0.04 | 0.04 | — | 0.04 | 0.04 | 0.04 | 0.04 | — |
|  |  | M2 | — | — | 0.2 | — | — | — | — | 0.2 |

TABLE 1-continued

|  |  |  | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|---|---|
|  | Blowing agent | H1 | 1.44 | 1.44 | 1.44 | 1.44 | 1.44 | 1.44 | 1.44 | 1.44 |
|  | Foam stabilizer | S1 | 0.35 | 0.35 | 0.35 | 0.35 | 0.35 | 0.35 | 0.35 | 0.35 |
|  |  | S2 | 0.35 | 0.35 | 0.35 | 0.35 | 0.35 | 0.35 | 0.35 | 0.35 |
|  | Flame retardant | F1 |  |  |  | 5 |  |  |  |  |
|  |  | F2 |  |  |  |  | 5 |  |  |  |
|  | Isocyanate index |  | 80 | 80 | 80 | 85 | 85 | 100 | 100 | 100 |
| Evaluation of physical properties | Density (kg/m$^3$) |  | 68.9 | 73.6 | 62.6 | 73.1 | 71.2 | 58.4 | 58.2 | 56.3 |
|  | Air flow (L/min) |  | 91.0 | 98.0 | 94.0 | 75.9 | 76.8 | 3.0 | 43.0 | 19.0 |
|  | 25% ILD (N/314 cm$^2$) |  | 13 | 13 | 15 | 17 | 27 | 54 | 36 | 33 |
|  | Rebound resilience (%) |  | 1 | 1 | 3 | 1 | 3 | 15 | 13 | 7 |
|  | Dry set (%) |  | 42.1 | 47.1 | 43.7 | 45.3 | 40.6 | 3.0 | 6.8 | 4.7 |
|  | Wet set (%) |  | 48.5 | 49.9 | 49.2 | 45.1 | 46.7 | 3.3 | 4.1 | 5.0 |
| Flame retardancy (UL94) | Combustion distance (mm) |  |  |  |  | 10 | 0 |  |  |  |
|  | Combustion time (min) |  |  |  |  | 18 | 0 |  |  |  |
|  | Combustion rate (mm/min) |  |  |  |  | 33 | 0 |  |  |  |
|  | Judgment |  |  |  |  | HBF passed | HBF passed |  |  |  |
| Thermal compression test | Compressibility (%) (70° C.) | 0.5 H | 7.8 | 31.4 | 3.3 | 12.9 | 10.3 | 0.6 | 0.9 | 0.6 |
|  |  | 1.0 H | 8.6 | 38.5 | 6.4 | 20.9 | 14.8 | 0.6 | 1.3 | 1.0 |
|  |  | 2.0 H | 17.8 | 44.3 | 12.7 | 27.4 | 21.4 | 0.7 | 1.7 | 1.6 |
|  |  | 4.0 H | 27.1 | 47.5 | 23.5 | 32.2 | 28.5 | 1.4 | 2.9 | 1.8 |
|  |  | 6.0 H | 36.4 | 48.4 | 35.0 | 34.6 | 30.5 | 1.5 | 4.4 | 2.3 |
|  |  | 8.0 H | 37.5 | 49.7 | 36.9 | 38.6 | 34.8 | 1.5 | 4.6 | 2.3 |
|  | Compressibility (%) (100° C.) | 0.5 H | 4.0 | 28.7 | 2.9 | 19.1 | 12.8 | 0.5 | 0.6 | 0.0 |
|  |  | 1.0 H | 6.3 | 36.2 | 5.9 | 24.9 | 20.3 | 0.7 | 0.8 | 0.5 |
|  |  | 2.0 H | 23.7 | 42.6 | 21.9 | 36.5 | 29.3 | 1.0 | 1.2 | 1.1 |
|  |  | 4.0 H | 36.3 | 46.7 | 38.3 | 41.3 | 35.3 | 2.2 | 4.1 | 1.3 |
|  |  | 6.0 H | 41.6 | 48.7 | 43.7 | 44.6 | 39.3 | 5.9 | 15.6 | 3.9 |
|  |  | 8.0 H | 47.5 | 49.6 | 47.2 | 46.0 | 42.3 | 14.3 | 36.2 | 8.4 |

TABLE 2

|  |  |  | Ex. 6 | Ex. 7 | Ex. 8 | Comp. Ex. 1 | Comp. Ex. 4 | Comp. Ex. 5 |
|---|---|---|---|---|---|---|---|---|
| Polyol composition (P) | Polyol (A) | A1 | 27.7 | 23.5 | 23.5 | 27.7 | 27.7 | 27.7 |
|  |  | A2 | — | — | — | — | — | — |
|  | Polyol (B) | B1 | 38.8 | 33 | 33 | 38.8 | 38.8 | 38.8 |
|  |  | B2 | 31 | 41 | 41 | 31 | 31 | 31 |
|  | Polol (C) | C1 | 6 | 6 | — | 6 | 6 | 6 |
|  | Monool (D) | D1 | 7.5 | 7.5 | 7.5 | 7.5 | 7.5 | 7.5 |
| Urethane-forming catalyst |  | N1 | 0.25 | 0.25 | 0.5 | 0.25 | 0.25 | 0.25 |
|  |  | M1 | 0.04 | 0.04 | — | 0.04 | 0.04 | 0.04 |
|  |  | M2 | — | — | 0.5 | — | — | — |
| Blowing agent |  | H1 | 1.44 | 1.44 | 1.44 | 1.44 | 1.44 | 1.44 |
| Foam stabilizer |  | S1 | 0.35 | 0.35 | — | 0.35 | 0.35 | 0.35 |
|  |  | S2 | 0.35 | 0.35 | — | 0.35 | 0.35 | 0.35 |
| Isocyanate index |  |  | 85 | 85 | 85 | 100 | 94 | 90 |
| Evaluation of physical properties | Density (kg/m$^3$) |  | 63.8 | 63.9 | 65.2 | 58.4 | 62.5 | 62.5 |
|  | Air flow (L/min) |  | 73.0 | 65.0 | 31.0 | 3.0 | 14.8 | 22.0 |
|  | 25% ILD (N/314 cm$^2$) |  | 22 | 30 | 14 | 54 | 33 | 29 |
|  | Rebound resilience (%) |  | 7 | 8 | 1 | 15 | 13 | 8 |
|  | Dry set (%) |  | 35.8 | 26.8 | 42.7 | 3.0 | 12.8 | 35.4 |
|  | Wet set (%) |  | 46.8 | 35.8 | 45.2 | 3.3 | 13.1 | 40.9 |
| Hot press test (150° C.) |  |  | ○ | ○ | ○ | X | X | Δ |

As shown in Table 1, the flexible foams in Examples 1 to 3 wherein the isocyanate index was 80, and the flexible foams in Examples 4 and 5 wherein a flame retardant was added and the isocyanate index was 85, exhibited good compressibility in the thermal compression tests. Further, as shown in Table 2, the flexible polyurethane foams in Examples 6 to 8 wherein the isocyanate index was 85, exhibited good hot press moldability in the hot press tests.

Further, as shown in Tables 1 and 2, the flexible foams in Examples 1 to 8 had excellent low resiliency and air flow, and further the flexible foams in Examples 4 and 5 were excellent also in flame retardancy. Further, in the case of a flexible foam in Example 8, it was possible to produce the foam without using any foam stabilizer.

On the other hand, as shown in Table 1, the flexible foams in Comparative Examples 1 to 3 wherein the isocyanate index was 100, were inferior in the compressibility in the thermal compression tests. Further, as shown in Table 2, the flexible foams in Comparative Example 1 and in Comparative Example 4 wherein the isocyanate index was 94, were hardly hot press molded in the hot press tests. Further, a flexible foam in Comparative Example 5 wherein the isocyanate index was 90, was able to be hot press molded, but upon expiration of one hour, recovery of the thickness to some extent was observed.

Industrial Applicability

The flexible polyurethane foam obtained by the process of the present invention is excellent in low resiliency, air flow and hot moldability and thus is widely useful, for example, as a shock absorber, a sound absorber or a vibration absorber for automobiles, electronic equipments, etc.

The entire disclosure of Japanese Patent Application No. 2007-253298 filed on Sep. 28, 2007 including specification, claims and summary is incorporated herein by reference in its entirety.

What is claimed is:

1. A process for producing a flexible polyurethane foam, which comprises reacting a polyol composition (P) with a polyisocyanate compound (I) in the presence of an urethane-forming catalyst and a blowing agent, wherein the polyol composition (P) comprises the following polyol (A), the following polyol (B) and the following monool (D), and the ratio of isocyanate-reactive active hydrogen-containing compounds including the polyol composition (P) in the raw material to the polyisocyanate compound (I) is 65 to 85 by isocyanate index, wherein:

Polyol (A) is a polyoxypropylene polyol having an average of from 2 to 3 hydroxyl groups and a hydroxyl value of from 10 to 90 mgKOH/g, obtained by ring-opening polymerization of only propylene oxide to an initiator (a1);

Polyol (B) is a polyether polyol having an average of from 2 to 3 hydroxyl groups and a hydroxyl value of from 100 to 250 mgKOH/g, obtained by ring-opening polymerization of an alkylene oxide (b2) to an initiator (b1);

Monool (D) is a polyether monool having a hydroxyl value of from 5 to 200 mgKOH/g, obtained by ring-opening polymerization of an alkylene oxide (d2) to an initiator (d1); and the polyisocyanate compound (I) is a toluene diisocyanate (TDI) mixture comprising at least 20 mass % of 2,6-TDI.

2. The process for producing a flexible polyurethane foam according to claim 1, wherein the polyol composition (P) is reacted with the polyisocyanate compound (I) in the presence of a foam stabilizer in addition to the urethane-forming catalyst and the blowing agent.

3. The process for producing a flexible polyurethane foam according to claim 1, wherein the polyol composition (P) further contains the following polyol (C):

Polyol (C) is a polyether polyol having an average of from 2 to 6 hydroxyl groups, a hydroxyl value of from 15 to 99 mgKOH/g and an oxyethylene group content of at least 50 mass % in the total oxyalkylene groups (100 mass %), obtained by ring-opening polymerization of an alkylene oxide (c2) to an initiator (c1).

4. The process for producing a flexible polyurethane foam according to claim 3, wherein the mass ratio of the polyol (A) in the polyol composition (P) is from 5 to 50 parts by mass, based on the 100 parts by mass of the total mass of the polyol (A), the polyol (B) and the polyol (C).

5. The process for producing a flexible polyurethane foam according to claim 3, wherein the polyol (A) contains a polyether diol having 2 hydroxyl groups in an amount of from 50 to 100 mass % of the total polyol (A).

6. The process for producing a flexible polyurethane foam according to claim 3, wherein the mass ratio of the monool (D) in the polyol composition (P) is from 1 to 30 parts by mass per 100 parts by mass of the total mass of the polyol (A), the polyol (B) and the polyol (C).

7. The process for producing a flexible polyurethane foam according to claim 1, wherein the polyol (A) is a polyoxypropylene polyol obtained by ring-opening polymerization of only propylene oxide to an initiator (a1) in the presence of a double metal cyanide complex catalyst.

8. The process for producing a flexible polyurethane foam according to claim 1, wherein the monool (D) is a polyoxypropylene monool obtained by ring-opening polymerization of only propylene oxide to an initiator (d1).

9. The process for producing a flexible polyurethane foam according to claim 1, wherein the ring-opening polymerization catalyst for the monool (D) is a double metal cyanide complex catalyst.

10. A process for producing a hot press molded product, which comprises hot press molding a flexible polyurethane foam obtained by the process as defined in claim 1.

11. The process for producing a flexible polyurethane foam according to claim 1, wherein the flexible polyurethane foam has a rebound resilience of at most 10%.

12. The process for producing a flexible polyurethane foam according to claim 1, wherein the flexible polyurethane foam has an air flow of from 30 to 100 L/min.

13. The process for producing a flexible polyurethane foam according to claim 1, wherein said ratio is from 70 to 85.

14. The process for producing a flexible polyurethane foam according to claim 1, wherein said ratio is from 75 to 85.

15. The process for producing a flexible polyurethane foam according to claim 1, wherein the flexible polyurethane foam has a rebound resilience of at most 8%.

16. The process for producing a flexible polyurethane foam according to claim 1, wherein the flexible polyurethane foam has an air flow of from 40 to 100 L/min.

17. The process for producing a flexible polyurethane foam according to claim 1, wherein the flexible polyurethane foam has an air flow of from 70 to 100 L/min.

* * * * *